United States Patent Office 3,373,173
Patented Mar. 12, 1968

3,373,173
WATER-SOLUBLE SURFACTANT COMPOSITIONS IN THE FORM OF CONDENSATION PRODUCTS OF LONG CHAIN MONOCARBOXYLIC ACIDS, DIETHANOLAMINE AND AROMATIC POLYBASIC ACIDS IN CERTAIN MOL RATIOS
John T. Foley, Verona, and Graham Barker, Fairlawn, N.J., assignors to Witco Chemical Company, Inc., New York, N.Y., a corporation of Delaware
No Drawing. Filed Mar. 24, 1964, Ser. No. 354,424
17 Claims. (Cl. 260—404)

ABSTRACT OF THE DISCLOSURE

Water-soluble surfactants which are useful as detergents and emulsifying agents and which comprise condensation products of long chain aliphatic monocarboxllic acids, diethanolamine, and mononuclear aromatic polybasic acids in certain molar ratios to each other, depending upon whether the mononuclear aromatic polybasic acid is di-, carboxylic, tricarboxylic, tetracarboxylic or hexacarboxylic, illustrated by a condensation product of 1 mol of a long chain aliphatic monocarboxylic acid, 6 to 7.5 mols of diethanolamine, and 2 to 2.4 mols of phthalic anhydride.

Our invention relates to novel surfactant compositions.

The novel surfactant compositions of the present invention comprise condensation products of diethanolamine, long chain monocarboxylic acids and aromatic polybasic acids in certain molar ratios with respect to each other, hereafter described in detail. In the production of said condensation products, certain conditions must be observed, which will be referred to below, in order to obtain products with optimum properties.

Condensation products of diethanolamine with long chain monocarboxylic acids, and condensation products of diethanolamine with aromatic polybasic acids have long been known in the art, the former being disclosed, for instance, in Kritchevsky U.S. Patents Reissue No. 21,530 and No. 2,089,212, and the latter in Kritchevsky U.S. Patent No. 2,094,608. Those condensation products disclosed in Patent No. 2,089,212, exemplified particularly by condensation products of 2 mols of diethanolamine with approximately 1 mol of $C_{12}$–$C_{14}$ fatty acids, have gone into large commercial use as detergents and for other surfactant uses in a number of industries.

The prior art products of the type exemplified by condensation products of diethanolamine and $C_{12}$–$C_{14}$ fatty acids, particularly those in which the mol ratio of the diethanolamine to the $C_{12}$–$C_{14}$ fatty acids is approximately 2 to 1, are very predominately amides, with quite small amounts of esters and ester-amides and containing, also, uncondensed diethanolamine, at least some of which is present in the final condensation product in the form of diethanolamine soaps of the $C_{12}$–$C_{14}$ fatty acids. Such condensation products are quite readily dispersible in water. Generally speaking, they have reasonable solubility in water, the extent of such water-solubility being related to the extent to which amidification of the diethanolamine with the $C_{12}$–$C_{14}$ fatty acids has been effected. It is known to the art that, if the condensation reaction is carried out so that there is a relatively high content of esters or ester-amides in the final condensation product, water-solubility is decreased. Hence, techniques have heretofore been developed to influence equilibrium conditions so as to influence the condensation reaction, or resort has been had to post-condensation reaction treatments, to bring about amide formation to the maximum extent reasonably possible. Condensation products of the type referred to above, in which approximately 2 mols of diethanolamine are condensed with 1 mol of $C_{12}$–$C_{14}$ fatty acids, are generally characterized by a pH, in aqueous solution, say in a 3% solution in water, of about 9.2.

Condensation products made in accordance with our invention are characterized by exceptional solubility in water as well as in aqueous alkaline and acidic solutions and in aqueous solutions of various electrolytes. This is despite the fact that the reactants and the molar ratios thereof which we utilize, which we described below, would seem to dictate that products of impaired water-solubility would be obtained. Furthermore, the pH of the condensation products of our invention is generally materially lower than the pH of the condensation products of prior art products such as those referred to above, the pH of typical condensation products of our invention, for instance, in 3% solutions in water, falling within the range of 7.4 to 7.7. Our condensation products appear to have an appreciable content of residual uncondensed carboxyl groups which appear to be present in the form of the monoamide of the aromatic polybasic acid, said monoamide being present in the form of the diethanolamine salt thereof, which may account for their low pH values. Despite such residual uncondensed carboxyl groups, which, in diethanolamine-higher fatty acid condensation products of the prior art, also tend to impair water-solubility, our condensation products, as stated above, possess, surprisingly, exceptionally good water-solubility, especially in the presence of electrolytes.

In the production of the condensation products of our invention, the molar ratios of the ingredients utilized are as follows: for each mol of long chain monocarboxylic acid (or the equivalent thereof contained in an ester thereof if such is utilized as the source of said acid), there should be not substantially less than 2 mols nor substantially more than 3 mols of the aromatic polybasic acid, and by "substantially" we mean of the order of 20% molarly less or more, as the case may be. The amount of diethanolamine utilized in producing the condensation products should include 1.2 mols for each mol of long chain monocarboxylic acid plus 2.4 mols for each mol of aromatic dicarboxylic acid, or 3.6 mols for each mol of aromatic tricarboxylic acid, or 4.8 mols for each mol of aromatic tetracraboxylic acid, or 7.2 mols for each mol of aromatic hexacarboxylic acid, and, as will be understood, equivalent amounts of diethanolamine where mixtures of said aromatic carboxylic acids are used. Additional diethanolamine may be added without adverse effect but ordinarily should be avoided because of economic considerations. Generally, any such added amounts should not exceed 1 to 1.5 mols. By way of further illustration, where 1 mol of coconut oil mixed fatty acids, or other long chain monocarboxylic acid, and 2 mols of phthalic anhydride, or other aromatic dibasic acid, are utilized, the number of mols of diethanolamine to be employed in conjunction therewith in the condensation reaction should not exceed 10 mols and, more advantageously should lie within the range of 6 to 7 mols. A range of 6.5 to 6.7 mols of diethanolamine is especially desirable in this particular instance. Again, by way of further explanation, where 1 mol of coconut oil mixed fatty acids, or other long chain monocarboxylic acid, and 2 mols of benzene tricarboxylic acid, or other aromatic tribasic acid, are utilized, the number of mols of diethanolamine to be employed in the condensation reaction should not exceed 14 mols and, more advantageously, should lie within the range of 8.4 to 9 mols, with a range of 8.5 to 8.7 being particularly preferred. Finally, where 1 mol of long chain monocarboxylic acid and 3 mols of aromatic tribasic acid are utilized, it will be seen that the diethanolamine will be used in amounts in the range of 12 to 20 mols with 12 to 12.5 mols being preferred.

The condensation reaction, to split out water or an alcohol, as the case may be, depending upon whether the free long chain monocarboxylic acid or an ester thereof is used, is carried out, generally speaking, at a temperature in the range of about 180° F. to about 400° F., especially 300 to 350° F., with reaction times of 1½ to 6 hours, usually 2 to 4 hours. The condensation reaction is carried out under atmospheric pressure or in vacuo or in the presence of an inert gas, such as nitrogen or argon, and desirably under conditions of agitation of the reaction mixture. While condensation catalysts, particularly alkalies or alkaline materials such as caustic soda or caustic potash or sodium methylate, can be used, they are unnecessary to the production of the condensation products of the present invention. Where catalysts are used, and the long chain monocarboxylic acids are utilized in the form of their methyl esters, the condensation reactions can be carried out in the lower temperature ranges without unduly long reaction times.

The condensation products which represent the most important embodiments of our present invention are characterized by the solubility characteristics recited hereafter in Example 1, namely, one drop of the condensation product, when added to 50 ml. of separate aqueous solutions of (1) 25% caustic soda, (2) 25% sulfuric acid, and (3) 25% brine, and (4) 50 ml. of tap water, will, in each case, produce a clear solution.

Especially important embodiments of our condensation products are those produced by reacting (a) 1 mol of lauric acid, or myristic acid, or coconut oil mixed fatty acids or fractions thereof which are particularly high in their content of $C_{12}$–$C_{14}$ fatty acids, as such, or in the form of an ester such as the methyl esters or the triglyceride esters of said fatty acids (taking into account the fatty acids content thereof), (b) about 2 mols of phthalic anhydride, and (c) from about 6 to 6.8 and, better still, from 6.5 to 6.6 mols of diethanolamine; the reaction being carried out at a temperature in the range of about 300 to 335° F. and, better still, in the range of about 320 to 330° F., under a high vacuum, generally of the order of 20 to 27 and, preferably, in the range of about 24 to 26 inches of mercury, for about 2 hours or until the solubility characteristics referred to above are obtained, whereupon the condensation products are promptly cooled so as rapidly to reduce the temperature thereof to about 210° F. or below, after which water is admixed therewith, generally in proportions of the order of 10 to 15%, by weight of the condensation products, so as to render the resulting composition pourable and pumpable.

The long chain monocarboxylic acid constituent of the condensation products of our invention may be supplied in various forms as, for instance, as the free acid or as an ester of the free acid as, for example, a methyl ester or as a glyceride ester such as the triglyceride ester. The long chain monocarboxylic acid may contain as low as 8 carbon atoms and as high as 24 carbon atoms; but, in the usual case, when derived from animal or vegetal sources, will contain from 8 to 18 carbon atoms. Especially useful, particularly where the condensation products are used for detergent purposes, are commercial sources of fatty acids containing predominately from 12 to 14 carbon atoms. Illustrative examples of the long chain monocarboxylic acids include caprylic acid, pelargonic acid, lauric acid, myristic acid, palmitic acid, oleic acid, linoleic acid, tall oil fatty acids, stearic acid, and tallow fatty acids. Commercial mixtures of such monocarboxylic acids will usually be used, for economic reasons, as, for instance, coconut oil fatty acids or special fractions thereof which are especially high in lauric acid or myristic acid or mixtures of said $C_{12}$ and $C_{14}$ fatty acids. Where, as stated above the long chain monocarboxylic acid is supplied in the form of an ester, illustrative examples of such esters are methyl ester of lauric acid, methyl ester of myristic acid, methyl ester of coconut oil mixed fatty acids, coconut oil, palm kernel oil, babassu oil, tallow, cottonseed oil, corn oil and soya bean oil.

Various aromatic polybasic acid constituents can be utilized in the production of the novel condensation products of our invention, illustrative examples of which are phthalic acid, advantageously in the form of phthalic anhydride; isophthalic acid; hexahydrophthalic acid; terephthalic acid; mellitic acid, advantageously in the form of mellitic anhydride, prennitic acid, mellophanic acid, pyromellitic acid, hemimellitic acid, trimellitic acid and trimesic acid; and aromatic polybasic acid constituents having ring substituents of a type which do not adversely affect the water-solubility of the condensation products, suitable substituents being, for instance, hydroxyl and sulfonic groups. All of the foregoing aromatic polybasic acids, it will be noted, are mononuclear aromatic polybasic or polycarboxylic acids. Phthalic anhydride is especially useful in the production of the condensation products of our invention and its use, therefore, represents a particularly preferred, though limited, embodiment of the aromatic polybasic acid constituent utilized in the practice of our invention. It will be understood that the aromatic polybasic acid constituent may be supplied in the form of the free acid, or in the form of the anhydride as stated above, or it may be in the form of an ester as, for instance, the methyl or ethyl esters of the aromatic polybasic acid. It will be understood that mixtures of two or more aromatic polybasic acids or acid constituents can be used, if desired, although, usually, no especial advantages result therefrom.

Diethanolamine, in its commercial form as purchased, is most advantageously used as such in the production of the condensation products of our invention. Relatively small or minor proportions of other alkanolamines can be added thereto or admixed therewith and the condensation products of our invention produced therefrom. Such other alkanolamines include, for example, mono-ethanolamine, mono-isopropanolamine, diisopropanolamine, diethylethanolamine, and glycerolamines. Where utilized, they should not, generally speaking, be employed in amounts in excess of about 10% of the weight of the diethanolamine.

The following examples are illustrative of the practice of the present invention. They are not to be construed as in any way limitative of the scope of the invention since numerous other condensation products can readily be produced in the light of the teachings and guiding principles disclosed herein.

*Example 1*

(a) A stainless steel kettle is charged with 2784 pounds of diethanolamine, the contents are heated to about 215° F., agitated and a stream of gaseous nitrogen is bubbled through the diethanolamine. Then, 816 pounds of coconut oil mixed fatty acids are added while maintaining the temperature in the range of 210 to 220° F., followed by the addition of 1200 pounds of phthalic anhydride, all under conditions of agitation. The kettle is closed, then placed under a vacuum of 24 to 26 inches of mercury and the contents heated to 330° F .and held under said vacuum and temperature conditions for 2 hours or until a sample, when added to separate aqueous soluitons of (a) 25% caustic soda, (2) 25% sulfuric acid, and (3) 25% brine, and (4) plain tap water, in the form of one drop of the condensation product to 50 ml. of each of said solutions and of the tap water, produces a clear solution. Before sampling, the vacuum is desirably reduced to 8 inches with nitrogen gas.

(b) The condensation product, weighing 4464 pounds, is rapidly passed through a heat exchanger, to cool it quickly to about 212° F., into a holding tank, the vacuum and nitrogen are cut, and 400 pounds of water are sucked into said holding tank, under conditions of agitation until the final solution is homogeneous. The water content can be adjusted as desired, preferably to about 10 or 12%, by weight, of the finished solution. The condensation product, prior to admixture of the water therewith, is a clear, amber glassy gel essentially non-flowing at room temperature, becoming fluid at about 175° F. It can also be rendered fluid, as indicated above, by the addition thereto of suitable amounts of water, or by the addition of suitable amounts of ethanol.

Example 2

200 pounds of coconut oil mixed fatty acids, 332 pounds of isophthalic acid, and 695 pounds of diethanolamine are placed in a kettle and heated at about 300° F. for 4 hours under a vacuum of about 26 inches of mercury, with agitation, or until the solubility characteristics specified in Example 1 are contained. The resulting condensation product is then rapidly cooled to room temperature.

Example 3

282 pounds of stearic acid, 444 pounds of phthalic anhydride, and 950 pounds of diethanolamine are placed in a kettle and heated at about 300° F. for 4 hours under a blanket of gaseous nitrogen, with agitation. The resulting condensation product is rapidly cooled to room temperature.

Example 4

213 pounds of the methyl esters of coconut oil mixed fatty acids, 398 pounds of dimethyl phthalate, 685 pounds of diethanolamine, and 10 pounds of sodium methylate are placed in a kettle and heated at about 275° F. for 4 hours under a vacuum of about 26 inches of mercury, with agitation, or until the solubility characteristics specified in Example 1 are obtained. The resulting condensation product is rapidly cooled to room temperature.

Example 5

200 pounds of a fraction of coconut oil mixed fatty acids containing at least 90% lauric acid, 296 pounds of phthalic anhydride, and 700 pounds of diethanolamine are placed in a kettle and heated at about 330° F. for 2 hours under a vacuum of about 26 inches of mercury, with agitation, or until the solubility charcteristics set forth in Example 1 are obtained. The resulting condensation product is rapidly cooled to room temperature.

In addition to possessing excellent water-solubility, and excellent solubility in aqueous alkaline and acidic solutions as well as in aqueous solutions of various electrolytes, condensation products made pursuant to our invention are, generally, readily soluble in various alcohols, ketones, chlorinated hydrocarbons and aromatic hydrocarbons such as methyl alcohol, ethyl alcohol, isopropyl alcohol, acetone, trichloroethylene, benzene and toluene. They exhibit surface activity over a wide range of concentrations in water and in aqueous solutions of acids, alkalies, and various salts, from very dilute to very concentrated. Illustrative of such solutions in which said condensation products exhibit foaming and other surface active properties are 25% solutions in water of potassium hydroxide, sodium hydroxide, sulfuric acid, and sodium chloride. In the case of the sodium hydroxide solution, the condensation products have a gelling effect thereon which creates an apparent haze in said solution due to air entrained in the gel.

In the case of the condensation product of Example 1, surface tension measurements, using a concentration of 0.5%, by weight, in distilled water and in the stated solutions show the following results:

| Sample: | Surface tension, dynes/cm. |
| --- | --- |
| Distilled water | 28.8 |
| 25% aqueous solution of NaOH | 33.2 |
| 25% aqueous solution of $H_2SO_4$ | 31.3 |
| 25% aqueous solution of NaCl | 38.1 |

It may be noted that most synthetic detergents lower the surface tension of water generally to somewhere in the approximate range of 30 to 35 dynes/cm. when present in concentrations for 0.1 to 0.5% but are ineffective in strong or concentrated solutions of electrolytes. Condensation products of the present invention, exemplified by Example 1, however, are effective not only in water but also in a wide range of concentrations of electrolytes in aqueous solution.

Another highly desirable property of condensation products made in accordance with our invention is that they do not effect appreciable increase in viscosity in water solutions as do many commercial synthetic detergents. Thus, by way of illustration, the effect upon viscosity of water was measured by the addition thereto of the condensation product of Example 1, over a range up to 8%, and compared with a like range of concentrations of (1) dodecyl benzene sodium sulfonate and (2) "Igepal CO–630" (a commercial 9 mol ethylene oxide adduct of nonylphenol.) In concentrations up to 5%, the viscosity of the water solutions of each of the three products tested remained relatively low (although the viscosity of the solutions of our condensation product was generally distinctly lower); but, in the range of concentrations from about 5 to 8%, there was a very sharp increase in the viscosities of the solutions of the dodecyl benzene sodium sulfonate and the "Igepal CO–63" whereas the increase in the viscosity of the solutions of our condensation product was very slight.

Condensation products of our invention, typified by Example 1, exhibit a lower viscosity in water solution than do alkali metal soaps, various detergent type ethylene oxide adducts, and alkyl benzene sulfonates such as dodecyl benzene sodium sulfonate. The addition of said condensation products to aqueous solutions of said soaps or of said detergents does not reduce the viscosity thereof. The aforesaid condensation products have a hydrotropic effect upon various detergents both in fresh water and in water solutions of various electrolytes, that is, when said condensation products are added in sufficient quantities, they solubilize the detergents in aqueous solutions of electrolytes in which said detergents are not ordinarily soluble. By way of illustration, "Igepal CO–710" (nonylphenoxypoly(ethyleneoxy)ethanol) forms a cloudy dispersion in a 20% solution of sodium chloride in water. When 0.1 g. of the condensation product of Example 1 for each 0.5 g. of "Igepal CO–710" is added to said water solution of sodium chloride, the solution becomes completely clear. It may also be noted that, while lauric diethanolamides are generally good foaming agents and foam stabilizers, our condensation products are generally low, quick-breaking foamers.

The condensation products of our invention have utility in a wide variety of fields. Apart from their use as detergents, they are effective as emulsifiers, where, for instance, they produce aqueous-oleaginous emulsions which are useful in many fields such as cleaning and degreasing of metals, cosmetic creams, shampoos, and pesticidal compositions. One illustrative utility as an emulsifying agent is the preparation of emulsions of water with hydrophobic organic solvents such as toluene and xylene. Good emulsions can be made, for example, of (1) water, (2) 25% aqueous solution of sodium hydroxide, (3) 25% aqueous solution of potassium hydroxide, (4) 25% aqueous solution of sulfuric acid, and (5) 25% aqueous solution of sodium chloride, in each case with 10% toluene, using 1% of a condensation product such as is produced in accordance with Example 1.

The condensation products of our invention find use in the textile industry in kier boiling, wool fulling, cotton mercerizing, dyeing and soaping off operations; in the petroleum industry as water flood additives, oil field emulsions demulsifiers, drilling mud additives, in work over fluids and in acidizing operations; in the steel industry as pickling bath additives, plating bath additives, wetting agents for caustic solutions, in lubricant compositions, and as corrosion inhibitors; in the detergent, cleansing and cosmetic fields, as in built liquid detergents, in specialized industrial cleaning compositions, synthetic detergent bars, specialty shampoos and specialty cleansers; in the paper industry, as wetting agents in pulp digestion operations and

What we claim as new and desire to be protected by Letters Patent of the United States is:

1. A process for the production of water-soluble surfactants which comprises mixing together (a) a source of a long chain aliphatic monocarboxylic acid containing from 8 to 24 carbon atoms selected from the group consisting of said free acids and esters thereof, (b) diethanolamine, and (c) a source of mononuclear aromatic polybasic acid selected from the group consisting of said free acid, the anhydride and esters thereof, and heating the resulting mixture at a temperature in the range of 180 to 400° F. to effect the production of condensation products of said mixtures, said ingredients being present in a molar ratio as follows:
   (a) 1 mol of (a) calculated on the free acid basis
   (b) 1.2 mols of (b) for each mol of said monocarboxylic acid, plus molar proportions of (b) selected from the following:
      (i) 2.4 mols of (b) for each mol of mononuclear aromatic dicarboxylic acid
      (ii) 3.6 mols of (b) for each mol of mononuclear aromatic tricarboxylic acid
      (iii) 4.8 mols of (b) for each mol of mononuclear aromatic tetracarboxylic acid
      (iv) 7.2 mols of (b) for each mol of mononuclear aromatic hexacarboxylic acid
      (v) plus from 0 to 1.5 mols of (b)
   (c) 2 to 3 mols of (c) calculated on the free acid basis.

2. A process for the production of water-soluble surfactants which comprises mixing together (a) a source of a long chain aliphatic monocarboxylic acid containing from 8 to 24 carbon atoms selected from the group consisting of said free acids, and esters thereof, (b) diethanolamine, and (c) a source of mono-nuclear aromatic dibasic acid selected from the group consisting of said free acid, the anhydride and esters thereof, and heating the resulting mixture to effect the production of a condensation product of said mixture, said ingredients being present in a molar ratio substantially as follows:
   1 mol of (a) calculated on the free acid basis
   6 to 10 mols of (b)
   2 to 3 mols of (c) calculated on the free acid basis.

3. A process for the production of water-soluble surfactants which comprises mixing together (a) a source of a fatty acid containing from 12 to 18 carbon atoms selected from the group consisting of said free acids and esters thereof, (b) diethanolamine, and (c) a source of mononuclear aromatic dibasic acid selected from the group consisting of said free acid, the anhydride and esters thereof, and heating the resulting mixture at a temperature in the range of 180 to 400° F. to effect the production of a condensation product of said mixture, said ingredients being present in a molar ratio substantially as follows:
   1 mol of (a) calculated on the free acid basis
   6 to 7 mols of (b)
   2 to 3 mols of (c) calculated on the free acid basis.

4. A process for the production of water-soluble surfactants which comprises mixing together (a) a source of a fatty acid containing from 12 to 18 carbon atoms selected from the group consisting of said free acids and esters thereof, (b) diethanolamine, and (c) a source of mononuclear aromatic tribasic acid selected from the group consisting of said free acid, the anhydride and esters thereof, and heating the resulting mixture at a temperature in the range of 180 to 400° F. to effect the production of a condensation product of said mixture, said ingredients being present in a molar ratio as follows:
   1 mol of (a) calculated on the free acid basis
   8.4 to 20 mols of (b)
   2 to 3 mols of (c) calculated on the free acid basis.

5. A process for the production of water-soluble surfactants which comprises mixing together (a) a source of a long chain aliphatic monocarboxylic acid containing from 8 to 24 carbon atoms selected from the group consisting of said free acids and esters thereof, (b) diethanolamine, and (c) a source of mononuclear aromatic tribasic acid selected from the group consisting of said free acid, the anhydride and esters thereof, and heating the resulting mixture to effect the production of a condensation product of said mixture, said ingredients being present in a molar ratio as follows:
   1 mol of (a) calculated on the free acid basis
   8.4 to 14 mols of (b)
   2 to 3 mols of (c) calculated on the free acid basis.

6. A process for the production of water-soluble surfactants which comprises mixing together (a) a fatty acid containing from 12 to 18 carbon atoms, (b) diethanolamine, and (c) a mononuclear aromatic dibasic acid, and heating the resulting mixture at a temperature in the range of 180 to 400° F. until the resulting condensation product solubility in such that, when one drop thereof is added to 50 cc. of tap water as well as to 50 cc. each of 25% aqueous solutions of caustic soda, sulfuric acid, and sodium chloride, a clear solution is produced, said ingredients being present in a molar ratio substantially as follows:
   1 mol of (a)
   6 to 7.5 mols of (b)
   2 mols of (c).

7. A process for the production of water-soluble surfactants which comprises mixing together (a) a member selected from the group consisting of fatty acids containing from 12 to 18 carbon atoms and esters thereof, (b) diethanolamine, and (c) phthalic anhydride, and heating the resulting mixture at a temperature in the range of 180 to 400° F. until the resulting condensation product solubility is such that, when one drop thereof is added to 50 cc. of tap water as well as to 50 cc. each of 25% aqueous solutions of caustic soda, sulfuric acid, and sodium chloride, a clear solution is produced, said ingredients being present in a molar ratio substantially as follows:
   1 mol of (a) calculated on the free acid basis
   6 to 7 mols of (b)
   2 mols of (c).

8. A process for the production of water-soluble surfactants which comprises mixing together (a) fatty acid containing predominately $C_{12}$–$C_{14}$ fatty acids, (b) diethanolamine, and (c) phthalic anhydride, heating the resulting mixture under a vacuum of 20 to 27 inches of mercury at a temperature in the range of about 300 to 335° F. for about 2 to 4 hours, and rapidly cooling said condensation product to about 210° F., said ingredients being present in a molar ratio substantially as follows:
   1 mol of (a)
   6 to 6.7 mols of (b)
   2 mols of (c).

9. A process for the production of water-soluble surfactants which comprises mixing together (a) fatty acid containing predominately $C_{12}$–$C_{14}$ fatty acids, (b) diethanolamine, and (c) phthalic anhydride, heating the resulting mixture under a vacuum of 24 to 26 inches of mercury at a temperature in the range of about 320 to 330° F. for about 2 hours, and rapidly cooling said condensation product to below about 210° F., said ingredients being present in a molar ratio substantially as follows:
   1 mol of (a)
   6.6 mols of (b)
   2 mols of (c).

10. A process for the production of water-soluble surfactants which comprises mixing together (a) a member selected from the group consisting of fatty acids containing predominately $C_{12}$–$C_{14}$ fatty acids, (b) diethanolamine, and (c) phthalic anhydride, heating the resulting mixture under a vacuum of 24 to 26 inches of mercury at a temperature in the range of about 320 to 330° F. for about 2 hours, rapidly cooling said condensation product to about 210° F., and admixing said cooled condensation product with about 10 to 15%, by weight of water, said ingredients being present in a molar ratio substantially as follows:

1 mol of (a)
6.6 mols of (b)
2 mols of (c).

11. A water-soluble surfactant condensation product resulting from heating together at condensation reaction temperatures of a mixture of (a) a long chain aliphatic monocarboxylic acid containing from 8 to 24 carbon atoms, (b) diethanolamine, and (c) a source of mononuclear aromatic polybasic acid selected from the group consisting of said free acid, the anhydride and esters thereof, said ingredients being present in a molar ratio as follows:

(a) 1 mol of (a)
(b) 1.2 mols of (b) for each mol of said monocarboxylic acid, plus molar proportions of (b) selected from the following:
  (i) 2.4 mols of (b) for each mol of mononuclear aromatic dicarboxylic acid
  (ii) 3.6 mols of (b) for each mol of mononuclear aromatic tricarboxylic acid
  (iii) 4.8 mols of (b) for each mol of mononuclear aromatic tetracarboxylic acid
  (iv) 7.2 mols of (b) for each mol of mononuclear aromatic hexacarboxylic acid
  (v) plus from 0 to 1.5 mols of (b)
(c) 2 to 3 mols of (c) calculated on the free acid basis.

12. A water-soluble surfactant comprising a condensation product resulting from heating together at condensation reaction temperatures of a mixture of (a) a long chain aliphatic monocarboxylic acid containing from 8 to 24 carbon atoms, (b) diethanolamine, and (c) a mononuclear aromatic dibasic acid, said ingredients being present in a molar ratio substantially as follows:

1 mol of (a)
6 to 7.5 mols of (b)
2 to 2.4 mols of (c).

13. A water-soluble surfactant comprising a condensation product resulting from heating together at condensation reaction temperatures of a mixture of (a) a long chain aliphatic monocarboxylic acid containing from 8 to 24 carbon atoms, (b) diethanolamine, and (c) a mononuclear aromatic tribasic acid, said ingredients being present in a molar ratio substantially as follows:

1 mol of (a)
8.4 to 14 mols of (b)
2 to 3 mols of (c).

14. A water-soluble detergent comprising a condensation product resulting from heating together at condensation reaction temperatures of a mixture of (a) fatty acid consisting of predominately $C_{12}$–$C_{14}$ fatty acids, (b) diethanolamine, and (c) phthalic anhydride, said ingredients being present in a molar ratio substantially as follows:

1 mol of (a)
6 to 7 mols of (b)
2 to 2.4 mols of (c).

15. A water-soluble detergent comprising a condensation product resulting from heating together at condensation reaction temperatures of a mixture of (a) fatty acid consisting of predominately $C_{12}$–$C_{14}$ fatty acids, (b) diethanolamine, and (c) phthalic anhydride, said ingredients being present in a molar ratio substantially as follows:

1 mol of (a)
6.5 to 6.7 mols of (b)
2 mols of (c), said detergent having a pH, in 3% solution in water, of 7.4 to 7.7.

16. A water-soluble surfactant composition comprising a water solution containing from 85 to 90%, by weight, of a water-soluble condensation product produced by reacting together a mixture of (a) 1 mol of a member selected from the group consisting of predominately $C_{12}$–$C_{14}$ fatty acids, (b) 6 to 7 mols of diethanolamine, and (c) about 2 mols of phthalic anhydride at a temperature in the range of 300 to 330° F. until the condensation product is readily soluble in water.

17. A water-soluble surfactant condensation product produced by reacting together a mixture of 1 mol of fatty acid consisting of predominately $C_{12}$–$C_{14}$ fatty acids, (b) 6.5 to 6.7 mols of diethanolamine, and (c) about 2 mols of phthalic anhydride at a temperature between about 320 and 330° F. under a vacuum of about 24 to 26 inches of mercury for about 2 hours, followed by rapid cooling to below about 210° F.

References Cited

UNITED STATES PATENTS 2,106,522   12/1931   Ellis _____ 260—404
2,173,448   5/1937    Katzman et al. _____ 260—404
2,343,431   2/1941    Wells et al. _____ 260—404

NICHOLAS S. RIZZO, *Primary Examiner.*

F. A. MIKA, *Assistant Examiner.*